May 17, 1960 W. C. POWER 2,936,540

TELEVISION CHANNEL PROGRAM IDENTIFICATION DEVICE

Filed July 10, 1958 2 Sheets-Sheet 1

Inventor
Walter C. Power

By Hill, Sherman, Meroni, Gross & Simpson Attys

Inventor
Walter C. Power

By Hill, Sherman, Meroni, Gross & Simpson Attys

United States Patent Office 2,936,540

Patented May 17, 1960

2,936,540

TELEVISION CHANNEL PROGRAM IDENTIFICATION DEVICE

Walter C. Power, Evanston, Ill., assignor to MacFarland, Aveyard & Company, Chicago, Ill., a corporation of Delaware Application July 10, 1958, Serial No. 747,662

2 Claims. (Cl. 40—63)

The present invention relates to a television channel identification device.

In the television industry it is generally well known that the average person does not know what channel a given program is on. According to the present invention a television channel identification device has been developed which may be published for the purpose of quickly educating the public as to which television channel certain television programs are received. The television channel identification device also functions to stimulate public interest in the television programs carried on the particular channel on the day or date that the publication appears. The publication may be in any suitable form such as in the newspapers, on television, in the movies, or in magazines.

The principal object of the present invention is to provide a television channel identification device which is adapted to provide quick identification of a TV channel and which is further adapted to popularize the programs carried on the particular channel on the day or date of the publication of the device.

A further important object of the present invention is to provide a television channel identification device which may be readily assembled and broken down so that the device may be repeatedly used over a period of time.

Still another important object of the present invention is to provide a television channel identification device which may be used day after day merely by superimposing program markers on the television channel numeral.

According to the general features of the present invention a television channel identification device has been developed which comprises a numerical symbol indicative of a television channel, the numerical symbol is provided with means defining open spaces for the insertion of picture inserts bearing descriptive material, and picture inserts bearing descriptive material as to the names of programs and the scheduled times when the programs are to be shown on the television channel disposed in the open spaces in assembly with the television channel identification device.

Many other objects and features of the present invention will more fully become apparent after making reference to the detailed description which follows and the representative structural embodiments shown in the attached drawings.

Figure 1:
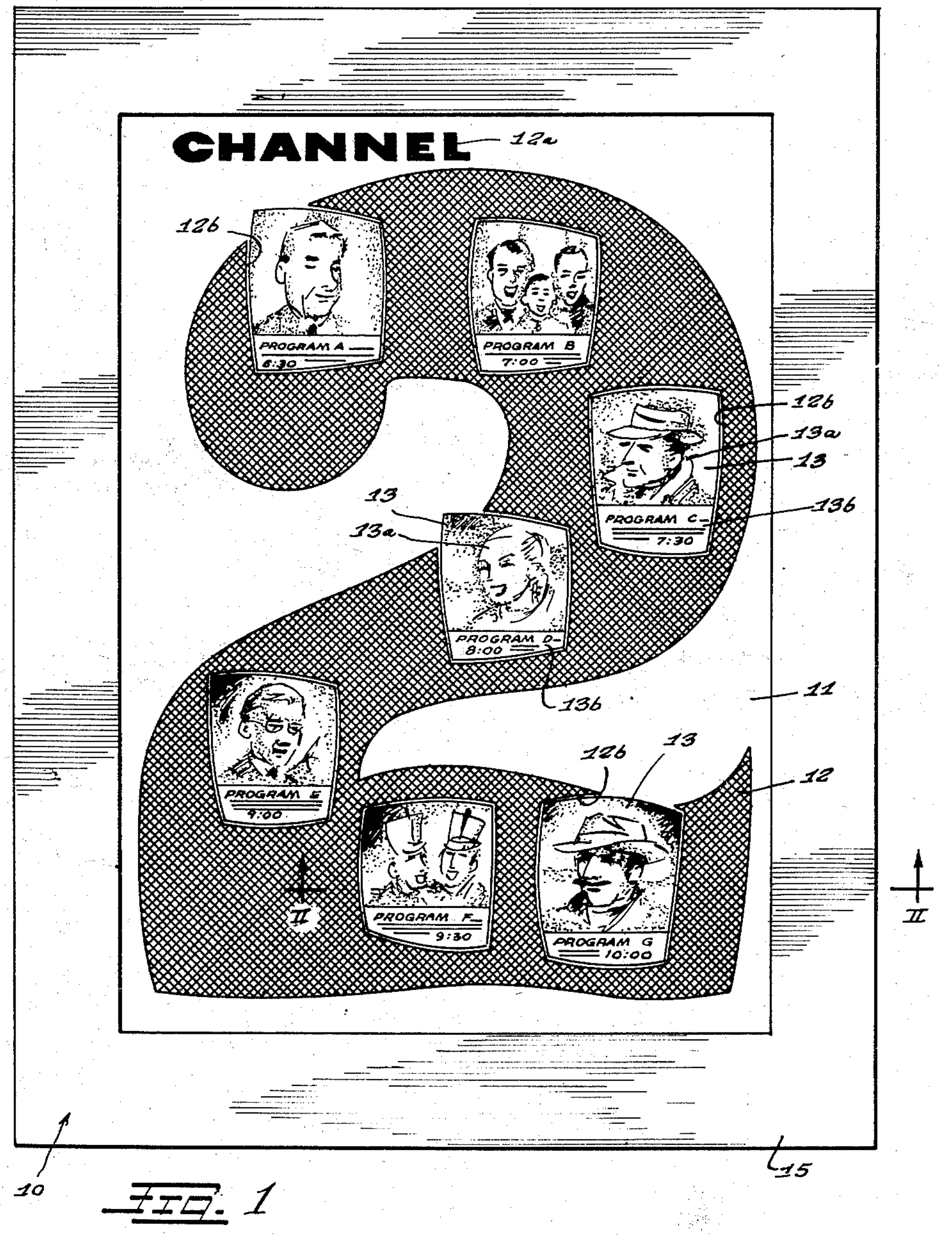
Figure 1 is an enlarged front elevation of my television channel identification device according to the principles of the present invention.
Figure 2:
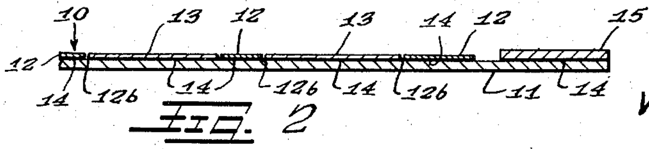
Figure 2 is an enlarged fragmentary cross-sectional view taken substantially on the line II—II of Figure 1 looking in the direction indicated by the arrow.

The reference numeral 10 in Figure 1 indicates generally a television channel identification device. The device 10 includes a rear plate 11 which has a numerical symbol or cut-out piece 12 mounted on the rear plate. Provided to the left and slightly above the numerical symbol 12 is the word Channel indicated at 12*a*. The numerical symbol 12 is provided with a series of cut-out openings or open areas 12*b* in which removable inserts 13 are adapted to be mounted.

The numerical symbol 12 as well as the inserts 13 may be secured to the rear plate 11 by means of peelable cement or the like 14. Also secured to the rear plate 11 by means of the peelable cement 14 is a frame plate 15.

The inserts 13 are each provided with a symbolic picture 13*a* which will graphically highlight and identify the program represented by the insert to the person examining the same. The name of the program and the time when the program is scheduled as is indicated at 13*b* is also provided on the insert. If desired, the name of the sponsor may also be designated on the insert. Preferably, the inserts are arranged in chronological order so that the person examining the device may readily ascertain the time sequence of the programs.

Figure 3:
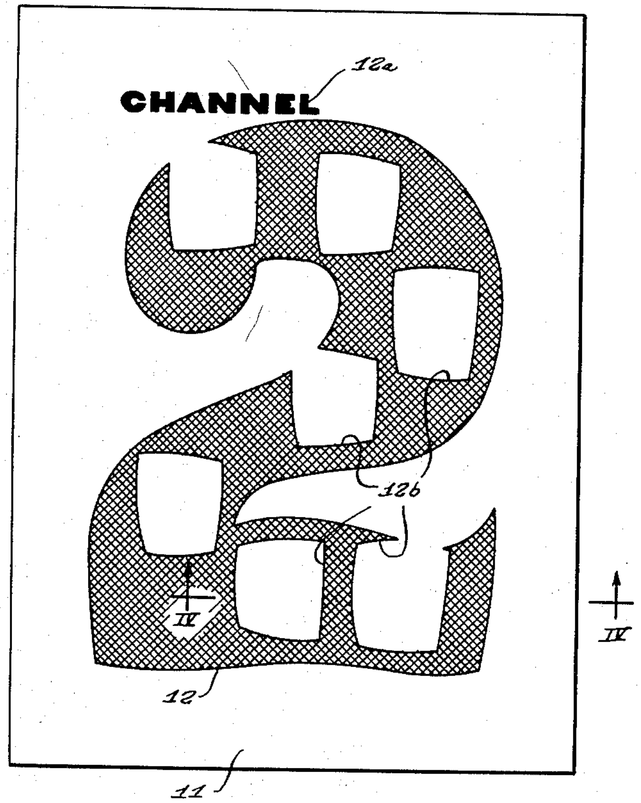
Figure 3 is an enlarged front elevation of the rear plate bearing the television channel numeral.

The television channel identification device 10 may be readily placed in condition for publication as once the television channel numeral is mounted upon the back plate 11, the inserts 13 may be secured in assembly therewith and readily removed therefrom for an indefinite period of time. By securing the components of the device together with peelable cement or the like 14 it will readily be appreciated how simply the components may be assembled, separated, and reassembled according to the needs of the user. In other words, the advertiser or publisher will readily be able to change the pictures on the basic plate as is shown in Figure 3 from day to day as the program on the television station changes. The television numerical symbol may be provided with a group of six pictures on Monday, a totally different group of pictures on Tuesday, and still another group of pictures on each of the other days of the week.

The component elements of the television channel identification devices shown in Figures 1–5 may be comprised of any suitable material such as a relatively stiff paper-like material or the like.

Figures 4, 5:
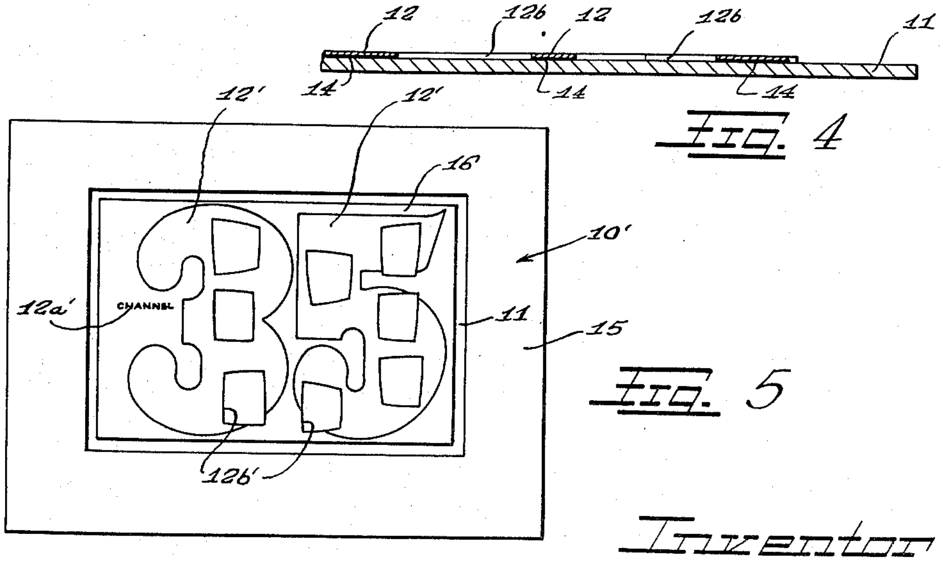
Figure 4 is an enlarged fragmentary cross-sectional view taken substantially on the line IV—IV of Figure 3 looking in the direction indicated by the arrow.
Figure 5 is a front elevation of a modified type of a television channel identification device.

Shown in Figure 5 is a modified type of television channel identification device indicated at 10′. This device is essentially of the same construction as that shown in the first form only a plural number of television numerals or symbols 12′ are carried on a sheet 16. The sheet 16 is mounted on the back plate 11 by any suitable means such as peelable cement or the like (not shown). Positioned to the left of the numerical symbols 12′ appears the word Channel as indicated at 12*a*′. Also provided on the sheet 16 and along the length of the numerals 12′ are a series of cut-out areas or openings indicated generally at 12*b*′. These cut-out areas 12*b*′ are provided on the numerical symbols so that inserts may be disposed therein the same manner as described in the form shown in Figures 1–4.

In view of the foregoing description it will now be appreciated that several different types of television channel and program indicator devices have been provided. Each of the different types of devices includes a plate bearing the enlarged television channel numeral indicium or indicia thereon. Indicia indicating the word channel is carried on the device to one side of the enlarged television channel numeral indicia. A series of individual program identifying indicia are carried on the device and are spaced along the length of the enlarged television channel numeral indicia. Each of the individual program identifying indicia includes picture indicia graphically identifying the program as well as descriptive indicia setting forth the name of the program and the scheduled time when the program is to be shown.

In view of the foregoing it will now be appreciated how the person examining the television channel identification devices will be able to associate quickly certain programs with a given channel number. The devices will also operate to accustom the public to associate these programs with certain television channels. It is far simpler to publish the time schedules of television programs by utilizing a television channel identification device by an advertiser or a publisher as opposed to having to write descriptive texts which is the conventional procedure now followed. By following this procedure a considerable advertising cost savings may be brought about. Also, the present devices are far more effective in advertising the programs as well as educating the public to associate a particular television channel with its programs.

It will be understood that modifications and variations may be effected without departing from the scope of the novel concepts of the present invention.

I claim as my invention:

1. A television channel identification device comprising a back plate, a numerical symbol indicative of a television channel mounted on the back plate, the numerical symbol being provided with means defining a series of open areas along its length for the insertion of inserts, inserts mounted in the open areas in assembly with the device, the inserts each bearing a picture graphically identifying the program as well as descriptive material setting forth the names of the programs and the scheduled times when the programs are to be shown on the television channel, and a frame secured to the back plate framing the numerical symbol.

2. A television channel identification device comprising a back plate, a numerical symbol indicative of a television channel mounted on the back plate, the numerical symbol being provided with means defining a series of open areas along its length for the insertion of inserts, inserts mounted in the open areas in assembly with the device, the inserts each bearing a picture graphically identifying the program as well as descriptive material setting forth the names of the programs and the scheduled times when the programs are to be shown on the television channel, and a frame secured to the back plate framing the numerical symbol, the inserts each having a peelable cement provided thereon enabling the inserts to be readily assembled and removed from the device so the device may be repeatedly used over a period of time.

References Cited in the file of this patent

UNITED STATES PATENTS

| | | |
|---|---|---|
| 1,830,960 | Philibert | Nov. 10, 1931 |
| 2,360,362 | Orosz | Oct. 17, 1944 |
| 2,767,495 | Harris | Oct. 23, 1956 |
| 2,769,260 | Fenwick | Nov. 6, 1956 |

FOREIGN PATENTS

| | | |
|---|---|---|
| 4,495 | Great Britain | Mar. 7, 1892 |